(12) United States Patent
Fritz et al.

(10) Patent No.: US 8,994,524 B2
(45) Date of Patent: Mar. 31, 2015

(54) PULSED INDICATION UNIT FOR VEHICLE

(75) Inventors: Daniel Fritz, Weinstadt (DE); Soenke Goldschmidt, Weinstadt (DE)

(73) Assignee: SMR Patents S.a.r.l., Luxembourg (LU)

(*) Notice: Subject to any disclaimer, the term of this patent is extended or adjusted under 35 U.S.C. 154(b) by 339 days.

(21) Appl. No.: 13/240,758

(22) Filed: Sep. 22, 2011

(65) Prior Publication Data

US 2012/0086565 A1    Apr. 12, 2012

(30) Foreign Application Priority Data

Oct. 11, 2010    (EP) ..................................... 10187091

(51) Int. Cl.
*B60Q 1/26*    (2006.01)
*B60R 1/12*    (2006.01)
*H05B 33/08*    (2006.01)

(52) U.S. Cl.
CPC ............ *B60Q 1/2665* (2013.01); *B60R 1/1207* (2013.01); *H05B 33/0815* (2013.01); *H05B 33/0845* (2013.01); *Y02B 20/346* (2013.01)
USPC ........... 340/468; 340/471; 340/475; 340/463; 340/465; 340/425.5

(58) Field of Classification Search
CPC .... F21Y 2101/02; Y10S 362/80; B60K 35/00
USPC ............ 340/425.5, 426.22, 426.23, 438, 439, 340/557, 815.45; 362/459, 487, 545–545
See application file for complete search history.

(56) References Cited

U.S. PATENT DOCUMENTS

| | | | |
|---|---|---|---|
| 6,371,636 B1* | 4/2002 | Wesson ......................... | 362/545 |
| 2005/0046696 A1* | 3/2005 | Lang et al. .................... | 348/148 |
| 2006/0158134 A1* | 7/2006 | Maxik ........................... | 315/224 |
| 2007/0046485 A1* | 3/2007 | Grootes et al. ........... | 340/815.45 |
| 2007/0194905 A1* | 8/2007 | Herrig et al. ................. | 340/471 |
| 2009/0201690 A1* | 8/2009 | Boivin et al. ................ | 362/494 |
| 2010/0052536 A1* | 3/2010 | Zielinski et al. ............... | 315/77 |
| 2012/0154591 A1* | 6/2012 | Baur et al. .................... | 348/148 |

FOREIGN PATENT DOCUMENTS

| | | |
|---|---|---|
| DE | 10260796 | 9/2004 |
| DE | 102007002809 | 7/2008 |
| EP | 1120312 | 8/2001 |

OTHER PUBLICATIONS

European Search Report for application No. EP 10 18 7091 dated Feb. 23, 2011.

* cited by examiner

*Primary Examiner* — Brian Zimmerman
*Assistant Examiner* — Laura Nguyen
(74) *Attorney, Agent, or Firm* — Reising Ethington PC

(57) ABSTRACT

An indication unit for vehicles is suggested, which comprises at least one LED and at least one electrical circuit in a housing. The indication unit is connected to a first control, which is arranged in the vehicle, and connected to an LED driver circuit. A second control circuit, which is arranged in or on the housing of the indication unit, operates the LED with pulse-width modulated signals.

10 Claims, 5 Drawing Sheets

PULSED INDICATION UNIT FOR VEHICLE

The invention is based on a priority patent application EP 10187091.3 which is hereby incorporated by reference.

BACKGROUND ART

1. Field of the Invention

The invention relates to an indication unit for vehicles, which comprises at least one LED and at least one electrical circuit in a housing. The indication unit is connected to a first controller, which is arranged in the vehicle, and to an LED driver circuit. A second control circuit, which is arranged in or on the housing of the indication unit, operates the LED with pulse-width modulated signals.

Furthermore, it is an object of the invention to propose a process for control of an indication unit, in which the control signals from the vehicle are overlaid with control signals of the indication unit.

2. Description of the Related Art

Indication units on the vehicle are used both inside the vehicle on the dashboard, as well as in or on the interior mirror, but also outside the vehicle, in the field of view of the driver. The mounting position of the exterior mirror or a camera is suitable here. The mirror housing or camera housing, which is already available, can contain different indication units.

Many exterior mirrors comprise an indicator lamp as a typical indication unit, which extends along the front side of the mirror housing in the direction of movement. For road users who are next to or behind the exterior mirror, the indicator lamp can generally not be seen, or only insufficiently. Therefore, additional measures are taken, e.g. using additional LEDs, which radiate along the direction of travel, and are integrated on the outermost edge of the exterior mirror in the indicator.

According to ECE regulations, an additional indicator light in the exterior mirror should illuminate a region beginning from 5° from the longitudinal axis of the vehicle, up to 60° to the longitudinal axis of the vehicle in the opposite direction of movement. The light intensity in this region, which is regulated by law, is defined in the process and must be achieved.

A variety of solutions for indicators in the exterior rear view mirror is known from the prior art. Here, indicator modules are integrated into the housing of an exterior mirror. According to the design, these indicator modules contain fibre optic cables, reflectors, printed circuit boards, lenses and cover glass and illuminants. LEDs are increasingly used as illuminants due to the known advantages.

However, for cost reasons, a simple construction and a reduction of LEDs used is necessary, whereby the light yield must be optimized.

In EP 1120312, an exterior mirror with an indicator is known, which comprises a light module, in which a variety of LEDs shine through openings of a reflector. The LED, which is located on the outermost edge of the exterior mirror, has a radiating direction corresponding to the legal regulations on radiation characteristics. The beam-forming is effectuated by the reflector. The whole light module is clipped into the housing of the exterior mirror, and is electrically contacted by a plug connection.

The wide use of LEDs as a lighting means in a vehicle is known. LEDs are used in front lights and tail lights. In the process, the LEDs can be controlled with pulse-width modulated signals. A dimming effect is achieved by this control, or else the tolerance of the LEDs is compensated in relation to fluctuations in the power supply system of the vehicle. The duty cycle of the signal is significant in the process. The duty cycle is calculated from the switch-on time and the cycle duration of the pulse.

Groups of LEDs are known in DE 102007002809, which are controlled by being pulsed against each other in phases. The reason for this is the implementation of a dimming effect by a duty cycle of approximately 10%, as well as the operation of a variety of LEDs without the occurrence of a flickering effect.

The present invention uses a pulse-width modulation for LEDs, in order to raise the lifespan of the LEDs, on one hand, and on the other hand, in order to exploit an optical effect, which is known as the Broca-Sulzer effect. This effect describes the physiological behavior of the human eye, which perceives short pulses of a certain length as brighter than pulses of a longer length.

DE10260796 shows a control device for the signaling lights of a vehicle. In this publication, the flashing of the different light sources is controlled by a pulse-width modulation. In an example, the bright phase of the indicator is overlaid with a further frequency. Efforts will be made to optimize the optical quality.

SUMMARY OF THE INVENTION

The object of the invention is to realize an indication unit, in which LEDs are operated with short current pulses, and the average energy use can be reduced. The LEDs are therefore protected against overheating, whilst the legal requirements for light intensity are still met.

In a further step, these advantages are combined with the effect of human perception of short pulses.

The object is therefore achieved by an indication unit for vehicles, which comprises at least one housing for receiving at least one LED and at least one electrical circuit, whereby an LED driver circuit 11 of an LED indication unit 3, 14 is connected to a first control 12, which is arranged in the vehicle and delivers switch-on and switch-off signals, and whereby a second control circuit 13 is arranged in or on the indication unit 3, which acts on the at least one LED with pulse-width modulated signals 23, 24 with a frequency of over 100 Hz.

BRIEF DESCRIPTION OF THE DRAWINGS

Advantages of the invention are explained in more detail in the subsequent description.

DETAILED DESCRIPTION OF THE DRAWINGS

Figure 1:
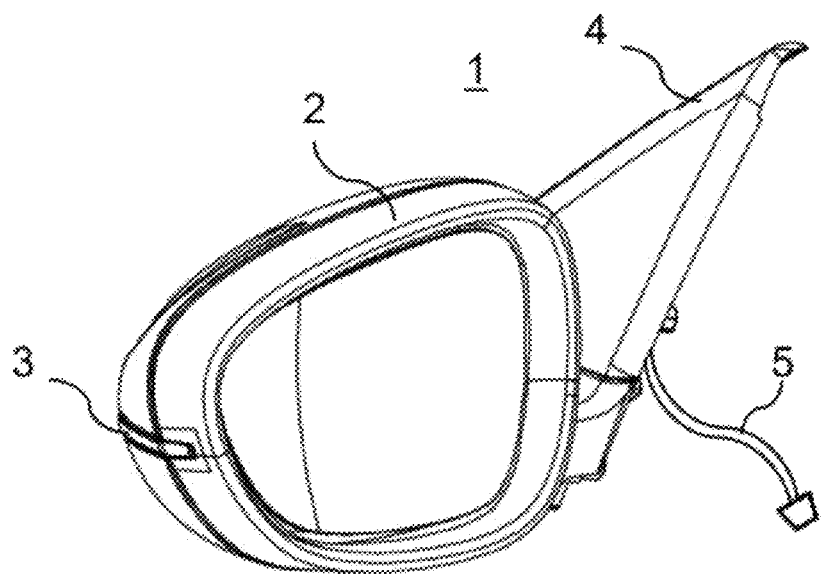
FIG. 1 shows an exterior mirror with an indication unit.

FIG. 1 schematically shows an exterior mirror 1, which comprises a mirror base 4 and a mirror head 2, in the form shown. The mirror is attached to a vehicle with the mirror base 4. The mirror head 2 forms a functional body, which is usually pivotably mounted on the mirror base. The mirror head here includes a mirror glass, a mirror glass motor and further electrical functions, as well as the indication units according to the invention. In the process, a lamp is understood by 'indication unit', which is automatically switched on or off due to a control signal from the vehicle or from the detection unit, and its light signal can be perceived by the driver.

This here concerns a direction indicator or indicator 3, for example. In the example of FIG. 1, the indicator 3 is installed on the external edge of the exterior mirror, and is barely visible to the driver. It can extend over the rear side of the mirror housing. Other installation positions are also possible for the indicator. The electrical users in the exterior mirror are connected to the on-board power supply via a cable 5. By means of the cable, the users are provided with power and the control signals are sent for control of the indication units, for example.

Installation of the indication units in the exterior mirror is only one possibility. For future applications, external cameras are provided, which are installed in place of the exterior mirror. The cameras comprise smaller housings than an exterior mirror, since they only contain sensors and electrical controls. If a camera housing is installed in the field of vision of the driver, it is expedient to place an indication unit in the housing.

A further installation location is given in the interior mirror of the vehicle. An indication unit, which is controlled by the vehicle, and attracts attention by a light signal, is useful here.

Figure 2:
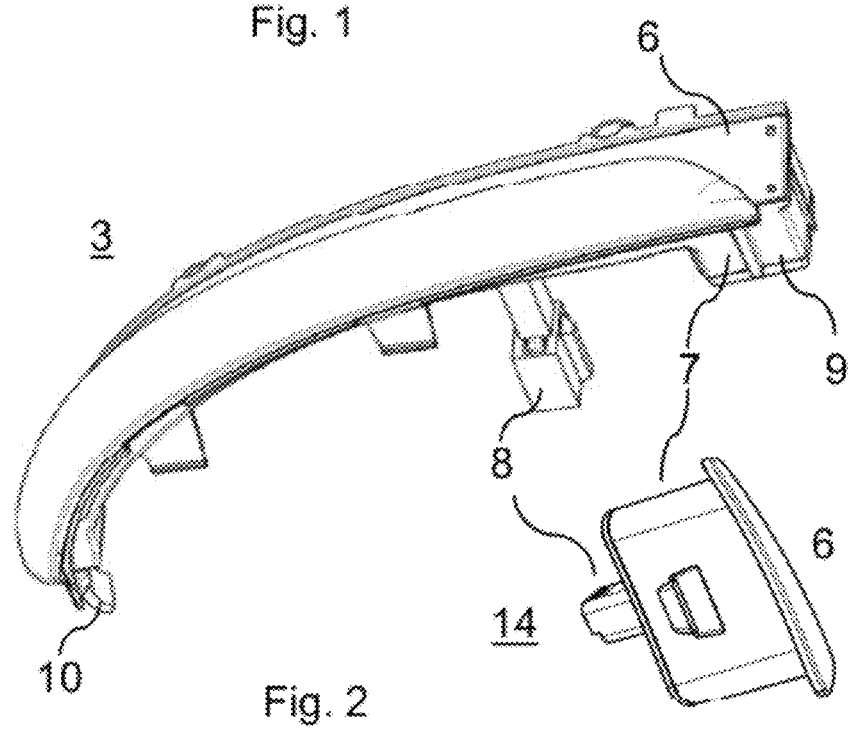
FIG. 2 is an example of an indication unit.

FIG. 2 shows examples of the indication unit. An indicator 3 is shown as an example. It is built as an independent indicator module, which, however, shall not limit the invention to self-contained modules. Open indicator installations are also included. The indicator 3 consists of a module housing 7, which is completely closed by a lens 6. In differing embodiments, the closed indicator module contains one or several LEDs as light sources, which are mounted on a printed circuit board 7 and connected to LED drivers. Furthermore, the indicator module can contain further optical components, such as light conductors, light diffusers, Fresnel lenses, reflectors or combinations of all of these elements.

The light of this indicator is decoupled over the surface of the lens 6 and at the end point of the lens 10. The module can be joined to the electrical network by a plug connector 18.

A further example of an indication unit is presented with a lane change indicator 14. The lane change indicator 14 also comprises a module housing 7 and a lens 6.

A simple module of this type can be used as ambient lighting, which illuminates a region next to the vehicle, or lights the vehicle door.

All indication units are controlled by a control, which is arranged in the vehicle itself. As an alternative to this, it is conceivable for a warning function to control the indication lights directly from the sensor, without going via a central vehicle control.

Figure 3:
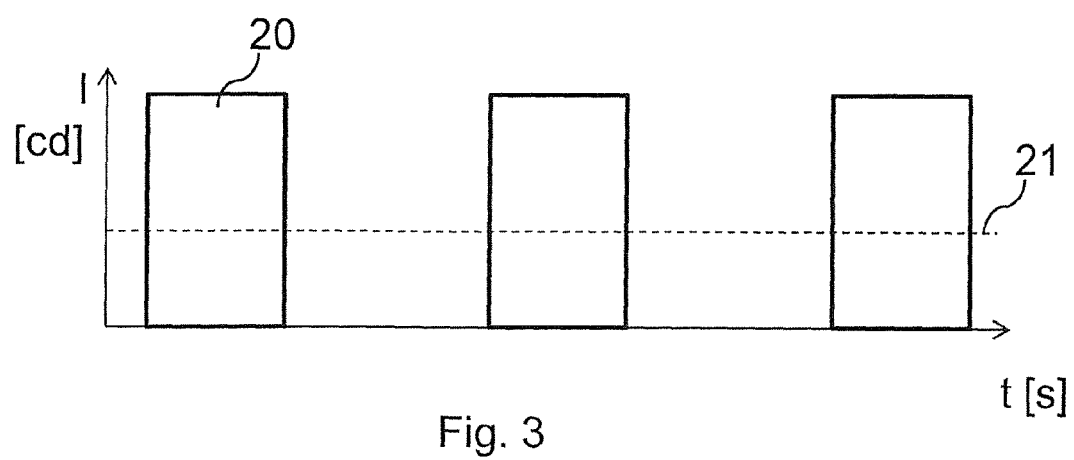
FIG. 3 is a temporal graph of an indicator signal.

FIG. 3 shows an example for the course of an indicator signal 20, which is sent from the indicator control centrally to all indicators installed on the vehicle. A legal requirement stipulates that all indicators of a side are controlled synchronously, as well as the indicators of both vehicle sides for the warning light facility.

The indicator frequency here is 1.5 Hertz at a duty cycle of circa 50%.

The effective light intensity I, measured in candela, is indicated with the dotted line 21. The legal requirements call for a light intensity of 0.6 cd minimum to 200 cd maximum, for example, which is integrally measured.

Figure 4:
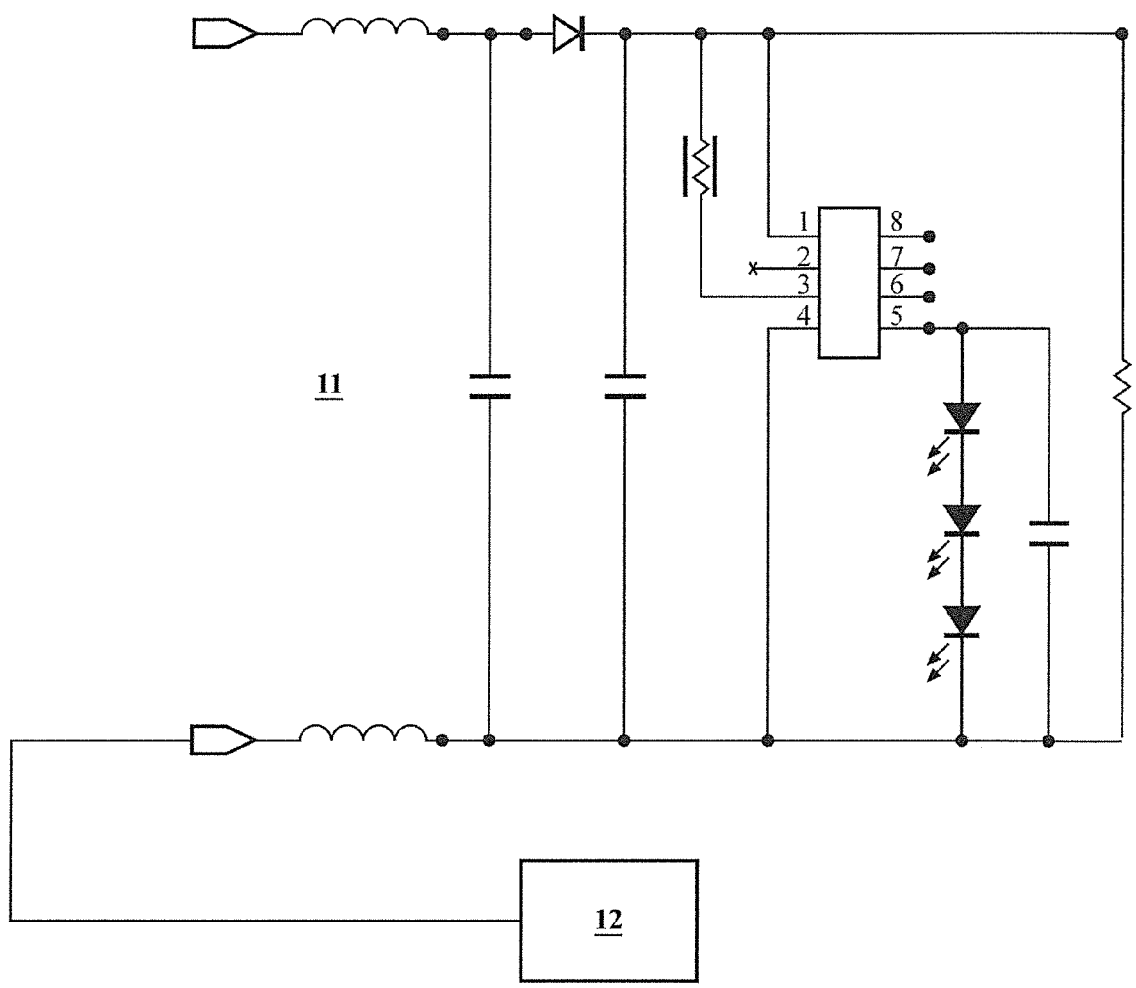
FIG. 4 is a circuit diagram of a control circuit for the LEDs.

A representative control of the LED in an indicator is executed in FIG. 4. The LED driver circuit 11 is connected to the vehicle-sided first control circuit 12 in the vehicle. In the example selected, three LEDs connected in series are controlled, whereby an LED driver component is used here, which guarantees constant LED current, even if the voltage fluctuates in the on-board power supply on the vehicle side. The desired current for the LEDs can thus be set in a simple way.

Figure 5:
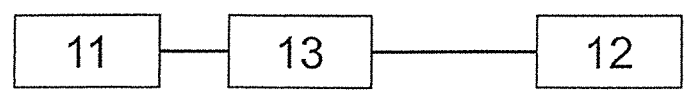
FIG. 5 control circuit is a block diagram of a control circuit.

The solution according to the invention is shown schematically in FIG. 5. In the process, the LED driver circuit 11 is not directly connected to the first control circuit 12 in the vehicle, but rather a pulse circuit, a second control circuit 13, is connected in between these. In the process, the circuits 11 and 13 can also be realized in a unit. Only the vehicle-sided first control circuit 12 is arranged in a spatially separated manner, and is connected to the circuits 11 and 13 by means of electrical connections, or a bus system.

Figure 6:
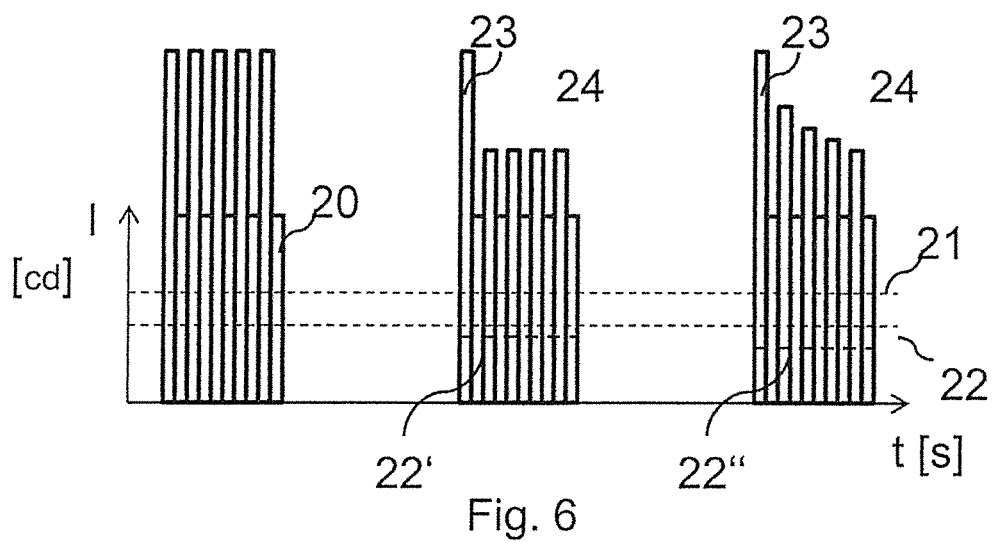
FIG. 6 is a temporal graph of an indicator signal with a pulsed LED.

FIG. 6 shows the solution according to the invention in the temporal course of the indicator signal. A further pulse-width modulated signal with short pulses is overlaid on the indicator signal from the vehicle. In the process, the frequency of the overlay signal is chosen with 100 to 200 Hz, so that the human eye cannot discern the pulse, but also so that no problems occur with EMV compatibility.

The duty cycle is chosen in such a way that the average light intensity still lies within the legal framework. The LEDs used are rested by the pulsed operation, and overheating is avoided. To the human eye, the indicator signal appears still with the frequency of 1.5 Hz.

A further improved version of the pulsed indicator is shown on the second pulse in FIG. 6. The process makes use of the phenomenon that the human eye perceives a short pulse as very bright. This is taken into account, as the first overlaid short pulse 23 is provided with a greater light intensity as the pulse sequence 24. Due to the Broca-Sulzer effect, the indicator signal is thus perceived as very bright, whilst the effective light intensity 22' decreases in relation to the first example. Whilst in the example of the second indicator signal, the pulse sequences 24 have the same light intensity, the pulse sequences 23 in example 3 are continually reduced in their light intensity. The effective light intensity 22' can thus decrease further.

Figure 7:
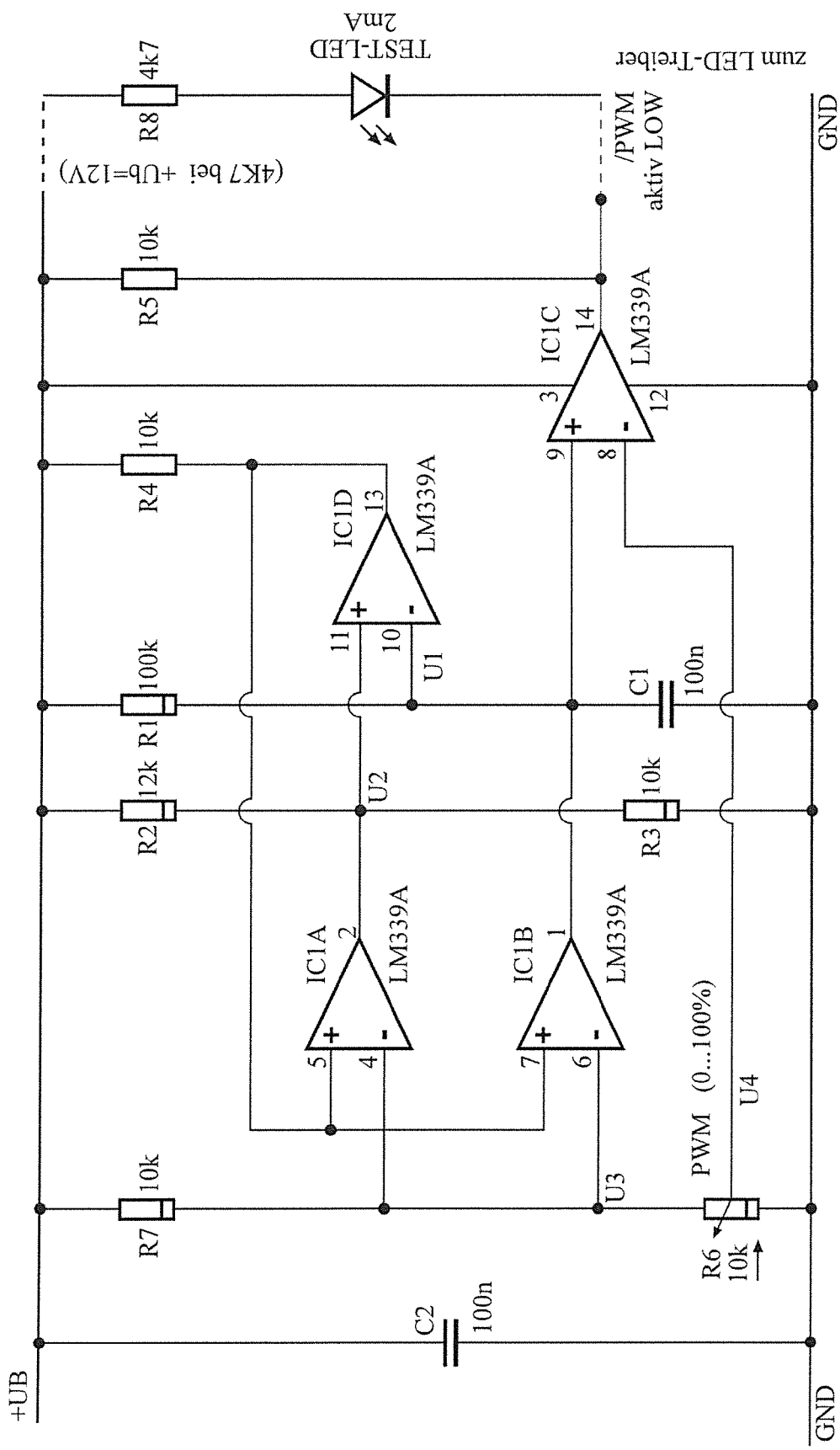
FIG. 7 is a circuit diagram of a control circuit for fast pulses.

The overlay pulses are generated by the pulse circuit, the second control circuit 13, and an indicator signal overlays the first control circuit 12 on the vehicle side. An example of a pulse-width modulated, second control circuit is shown in FIG. 7. The subject here is a conventional LED pulse-width modulation circuit. As an alternative to a circuit of this type, it is possible to use programmable controllers, which can realize a pulse course in a simple way, as shown in pulses two and three of FIG. 6.

This circuit according to FIG. 7 uses the following construction in order to realize an exponential sawtooth oscillator: An RC element R1/C1 is exponentially charged by a supply voltage +UB, and when a threshold U2 determined by R2/R3 is reached, just under +Ub/2, the capacitor C1 is again discharged by an open collector output of the comparator IC1B.

At the same time, the reference U2 is drawn down by the comparator IC1A during this process to ca. 0.1V, so that U1 now stays above U2, and C1 can be nearly completely discharged. Only when U1 reaches below U2, so 0.1V, the comparator IC1D switches, and the charging of the C1 begins again. The circuit functions reliably, without any trimming potentiometers being necessary, as long as R2<<R1. Then, the saturation voltage at IC1A at the time of the completed discharge process is always higher than the voltage on IC1B. Finally, in order to receive the desired PWM signal, one compares, by means of the comparator IC1C, the sawtooth voltage to an adjustable reference voltage U4, which can also lie above the sawtooth point voltage U2, due to the voltage divider R6/R7>R3/R2 or U3>U2. In this way, the circuit permits a 100% PWM duty cycle. The other extreme of 0% duty cycle, with output/PWM always HIGH or status always OFF, is also achieved: The remaining 0.1V as saturation voltage of IC1B during discharge of C1 lies above the minimal voltage of U4=0V. This method is very simple; the temporal behavior, the frequency of the oscillator and the PWM duty cycle is as good as independent of the supply voltage +Ub. The output of the circuit is connected to the LED driver circuit 11.

The circuit examples shall not limit the invention; every other type of control, which an expert would choose for the overlay of vehicle-sided signals and pulsed LED signals, is possible.

However, the indication unit according to the invention is not limited to a vehicle indicator.

The indication unit 14 is used as a lane change indicator, for example. By means of a warning display of this type, the driver is made aware of a dangerous situation and warned by an illuminated display. The warning is designed as a flashing display, since a flashing light attracts more attention from the driver. After detection of a dangerous situation, this information is processed in the vehicle, and a control signal, in a clocked manner, is given to the indication unit by a control unit, which is provided for this. This flashes a warning signal to the driver, with the duty cycle preferably lying between 50 and 90%. The pulsed PWM signal is overlaid on the vehicle-sided signal.

A warning signal of this type can be installed in the housing of the exterior mirror or of the interior mirror or of the camera, behind the mirror glass of the exterior mirror or of the interior mirror.

A further example is ambient lighting, which is designed according to the invention. Ambient lighting can be switched on or off by a control device of the vehicle. Upon approaching the vehicle and/or activation of the opening mechanism, the ambient lighting is activated on the vehicle side. The pulsed signal of the second control circuit overlays the vehicle-sided signal.

In addition to the already depicted advantages, there is also the advantage, with the second control circuit 13 for the PWM of the control signal, of being able to dim the LED by raising the set-point of the pulse and reducing the heat dissipation. Gradual fading of the LEDs is easy to implement here, by means of the off-signal of the vehicle.

The selected pulse widths and heights and the duty cycle must be adapted to the respective LEDs. The thermal output of the barrier layer increases with an increase of the duty cycle, and the light output as well as the light color of the LED is influenced.

Tests have shown that the radiation flux (energy per time unit) does not depend on the frequency of the pulse, but rather on the duty cycle. Thus, if one uses short pulses and a moderate duty cycle, one will minimize thermal problems, and simultaneously exploit the physiological effect on the human eye.

LEGEND

1 Exterior mirror
2 Mirror head
3 Indicator
4 Mirror base
5 Cable harness
6 Lens
7 Module housing
8 Plug connector
9 Printed circuit board
10 Light extraction
11 LED driver circuit
12 First control circuit on the vehicle side
13 Second control circuit
14 Warning display/light
20 Light intensity of the pulse
21 Average light intensity I
22 Average light intensity pulsed
22' Average light intensity with increased pulse
22" Average light intensity with continually decreasing output

The invention claimed is:
1. An indication unit for vehicles, said indication unit comprising:
  a housing fixedly secured within an interior mirror, an exterior mirror or a camera housing;
  an LED housed within said housing; and
  an electrical circuit comprising:
    a first control circuit arranged in a vehicle that outputs an indicator signal comprising a series of pulses, wherein the series of pulses correspond to an active phase of the indicator signal,
    a second control circuit that receives the indicator signal and overlays a pulse sequence with a frequency of over 100 Hz onto each active phase portion of the indicator signal, the pulse sequence comprising a first pulse and following pulses subsequent to the first pulse, the first of the pulse sequence having an amplitude that is increased in relation to the following pulses of the pulse sequence, to produce a pulse width modulated indicator signal, and
    an LED driver circuit that receives the pulse width modulated indicator signal and drives the LED with the pulse width modulated indicator signal, wherein when the LED is driven with the pulse width modulated indicator signal, the active phase of the pulse width modulated indicator signal causes the LED to be pulsed at light intensities in the range of an intensity of the indicator signal and an amplitude of the first pulse of the pulse sequence, wherein the initial pulse of the active phase of the pulse width modulated indicator causes the LED to have an initial pulse of increased light intensity in relation to following pulses of the active phase of the pulse width modulated indicator signal in order to reduce an effective light intensity of the LED.
2. The indication unit according to claim 1, characterized in that the pulse sequences have the same or a decreasing light intensity.
3. The indication unit according to claim 1, characterized in that the second control circuit contains a programmable controller.
4. The indication unit according to claim 1, characterized in that the first control in the vehicle is an indicator control.
5. The indication unit according to claim 1, characterized in that the first control controls a warning information display.
6. The indication unit according to claim 1, characterized in that the first control controls ambient lighting.
7. The indication unit according to claim 1, characterized in that the first control delivers pulse-width modulated signals between 1 and 10 Hz.
8. The indication unit according to claim 1, characterized in that the second control delivers pulse-width signals up to 500 Hz.
9. The indication unit according to claim 1, characterized in that said LED illuminates a lens, which is generally flat.
10. An indication unit for vehicles, said indication unit comprising:

a housing fixedly secured within an interior mirror, an exterior mirror or a camera housing;
an LED housed within said housing; and
an electrical circuit comprising:
a first control circuit arranged in a vehicle that outputs an indicator signal comprising a series of pulses, wherein the series of pulses correspond to an active phase of the indicator signal,
a second control circuit that receives the indicator signal and overlays a pulse sequence with a frequency of over 100 Hz onto each active phase portion of the indicator signal, the pulse sequence comprising a first pulse and following pulses subsequent to the first pulse, the first of the pulse sequence having an amplitude that is increased in relation to the following pulses of the pulse sequence, and the following pulses subsequent to the first pulse having equal duration and equal amplitude, to produce a pulse width modulated indicator signal, and
an LED driver circuit that receives the pulse width modulated indicator signal and drives the LED with the pulse width modulated indicator signal, wherein when the LED is driven with the pulse width modulated indicator signal, the active phase of the pulse width modulated indicator signal causes the LED to be pulsed at light intensities in the range of an intensity of the indicator signal and an amplitude of the first pulse of the pulse sequence, wherein the initial pulse of the active phase of the pulse width modulated indicator causes the LED to have an initial pulse of increased light intensity in relation to following pulses of the active phase of the pulse width modulated indicator signal in order to reduce an effective light intensity of the LED.

* * * * *